(12) United States Patent
Uegane et al.

(10) Patent No.: US 7,066,296 B2
(45) Date of Patent: Jun. 27, 2006

(54) VALVE DEVICE FOR SILENCER

(75) Inventors: Masayuki Uegane, Saitama (JP); Isao Hirokawa, Shizuoka (JP)

(73) Assignees: Honda Giken Kogyo Kabushiki Kaisha, Tokyo (JP); Yutaka Giken Co., Ltd., Shizuoka (JP)

( * ) Notice: Subject to any disclaimer, the term of this patent is extended or adjusted under 35 U.S.C. 154(b) by 289 days.

(21) Appl. No.: 10/679,886

(22) Filed: Oct. 6, 2003

(65) Prior Publication Data

US 2004/0065503 A1      Apr. 8, 2004

(30) Foreign Application Priority Data

Oct. 7, 2002 (JP) .............................. 2002-293505

(51) Int. Cl.
  *F01N 1/02* (2006.01)
  *F01N 1/16* (2006.01)
  *F16K 15/16* (2006.01)
  *F16K 15/14* (2006.01)

(52) U.S. Cl. .................. 181/254; 181/237; 137/855; 137/856; 137/857

(58) Field of Classification Search ............. 181/254, 181/237, 236, 253, 241
See application file for complete search history.

(56) References Cited

U.S. PATENT DOCUMENTS

| | | | | |
|---|---|---|---|---|
| 1,599,414 A | * | 9/1926 | Huff | ................ 137/512.1 |
| 1,614,124 A | * | 1/1927 | Hansen | ............... 137/512.15 |
| 4,079,808 A | * | 3/1978 | Mizuno et al. | ............. 181/237 |
| 4,179,883 A | * | 12/1979 | Nishiyama et al. | .......... 60/293 |
| 4,484,659 A | * | 11/1984 | Buchwalder | ............. 181/266 |
| 5,614,699 A | * | 3/1997 | Yashiro et al. | ............. 181/254 |
| 6,065,564 A | * | 5/2000 | Uegane | ............. 181/237 |
| 6,079,516 A | * | 6/2000 | Pearson | ............. 181/254 |
| 6,173,808 B1 | * | 1/2001 | Maeda et al. | ............. 181/254 |
| 6,899,199 B1 | * | 5/2005 | Sageman | ............. 181/237 |

FOREIGN PATENT DOCUMENTS

| | | | |
|---|---|---|---|
| DE | 19957711 A1 | * | 4/2001 |
| JP | 10-141041 | | 5/1998 |
| JP | 2001-020718 | | 1/2001 |
| JP | 2001-123817 | | 5/2001 |
| JP | 2002180815 A | * | 6/2002 |
| JP | 2004124905 A | * | 4/2004 |

* cited by examiner

*Primary Examiner*—Edgardo San Martin
(74) *Attorney, Agent, or Firm*—Carrier, Blackman & Associates, P.C.; Joseph P. Carrier; William D. Blackman

(57) ABSTRACT

A valve device for a silence opens a bypass passage provided in the silencer to flow exhaust gas through the bypass passage when exhaust gas pressure rises to a certain pressure. The valve device includes a base having a valve opening through which exhaust gas flows, and a plate-like valve for opening and closing the valve opening. The plate-like valve is fixed to the base at its proximal portion, and is bent at both edges thereof in a certain range extending from its distal end toward the proximal portion.

19 Claims, 4 Drawing Sheets

VALVE DEVICE FOR SILENCER

BACKGROUND OF THE INVENTION

1. Field of the Invention

The present invention relates to a valve device for use in a silencer that is interposed mainly in an exhaust system for a vehicle engine, and more particularly to a valve device which opens a bypass passage for exhaust gas in the silencer when the exhaust gas pressure rises to a certain pressure.

2. Discussion of Background Art

In general, a vehicle is required to ensure a sufficient engine output at a high speed rotating range in order to improve the performance during acceleration or high speed driving. Also, a vehicle is required to reduce exhaust noise in order to ensure calmness during idling or low speed driving. In other words, a vehicle is required to ensure a sufficient engine output at a high speed rotating range and is required to reduce exhaust noise of the engine at least at a low speed rotating range.

It is known that sectional area of a passage that forms an exhaust system of a vehicle engine has a great influence on engine output and exhaust noise. That is, with increasing the sectional area of the passage, more sufficient engine output can be obtained due to decreased exhaust resistance, however, more exhaust noise occurs with this decreased exhaust resistance. On the contrary, with decreasing the sectional area of the passage, less exhaust noise occurs due to increased exhaust resistance, however, the engine output decreases due to this increased exhaust resistance.

For this reason, Japanese Laid-open Patent Application No. 2001-123817 (see page 3 and FIG. 2, etc.) suggests to provide a bypass passage in the exhaust passage of a silencer that is provided in the exhaust system of the engine. The bypass passage further includes a valve device so that the bypass passage opens only during while driving at a high speed rotating range.

The valve device mainly includes a housing (base) having a valve opening, and a plate-like valve arranged to cover this valve opening. The plate-like valve is fixed to the housing at the proximal end thereof. The plate-like valve is deflected in accordance with pressure in the exhaust passage of the silencer and opens the valve opening.

However, exhaust gas pressure of the engine pulsates and the plate-like valve vibrates in accordance with the pulsation. Such vibration becomes greater at the distal end, and when the open/close vibration frequency conforms with the natural frequency of the plate-like valve, the plate-like valve resonates. When resonance of the plate-like valve occurs, operation of the valve disadvantageously becomes unstable or unusual noise occurs.

In view of the above, the present invention seeks to provide a valve device for a silencer, which restricts resonance of the plate-like valve.

SUMMARY OF THE INVENTION

According to the present invention, there is provided a valve device for a silencer, which opens a bypass passage provided in the silencer to flow exhaust gas through the bypass passage when exhaust gas pressure rises to a certain pressure, the valve device comprising: a base having a valve opening through which exhaust gas flows; and a plate-like valve for opening and closing the valve opening, the plate-like valve being fixed to the base at its proximal portion, wherein the plate-like valve is bent at both side edges thereof in a certain range extending from its distal end toward the proximal portion.

Because the plate-like valve is bent at both side edges thereof in a certain range extending from its distal end toward the proximal portion, the plate-like valve improves the stiffness against deflection at the time of opening/closing the valve, so that the plate-like valve deforms at its center proximity area that is remote from the distal end for a certain range. Generally, resonance is likely to occur at the distal end of the plate-like valve. However, the valve device according to the present invention is not likely to cause resonance because the flexural rigidity of the plate-like valve increases in a certain range from the distal end toward the proximal portion.

The aforementioned valve device may further comprise a plate spring member, and the distal end of the plate spring member abuts on a surface of the plate-like valve to urge the plate-like valve toward a valve close position. The plate spring member is obliquely arranged relative to the plate-like valve such that an abutting position of the plate spring member against the plate-like valve shifts toward the proximal portion of the plate-like valve with an increase in a deflection amount of the plate-like valve. The plate spring member abuts on a reinforced area of the plate-like valve that is reinforced by bending the side edges of the plate-like valve.

With this construction of the valve device, the abutting position of the plate spring member against the plate-like valve shifts toward the proximal portion of the plate-like valve with an increase in the deflection amount of the plate-like valve. Therefore, the moment, which is derived from the urging force of the plate spring member and acts in a direction to close the plate-like valve, decreases with an increase in the deflection amount of the plate-like valve. This can prevent the excessive state where the plate-like valve repeats open and close operations at a certain number of rotations of the engine, so that the valve opens and closes quickly. As the result, resonance of the plate-like valve hardly occurs.

Further, according to this valve device, the plate spring member abuts on a reinforced area of the plate-like valve that is reinforced by bending the side edges. To be more specific, the distal end of the plate spring member abuts on the plate-like valve in a certain range from the distal end of the plate-like valve, i.e. a surface of the range where the plate-like valve is bent at both side edges. This can achieve stable operation of the plate-like valve because the plate spring member stably applies the urging force to the plate-like valve.

Other and further objects, features, and advantages of the present invention will appear more fully from the following description.

BRIEF DESCRIPTION OF THE DRAWINGS

A preferred embodiment of the present invention will be described below, by way of example only, with reference to the accompanying drawings, in which.

DETAILED DESCRIPTION OF THE INVENTION

With reference to the accompanying drawings, one preferred embodiment of the present invention will be described.

Figure 1:
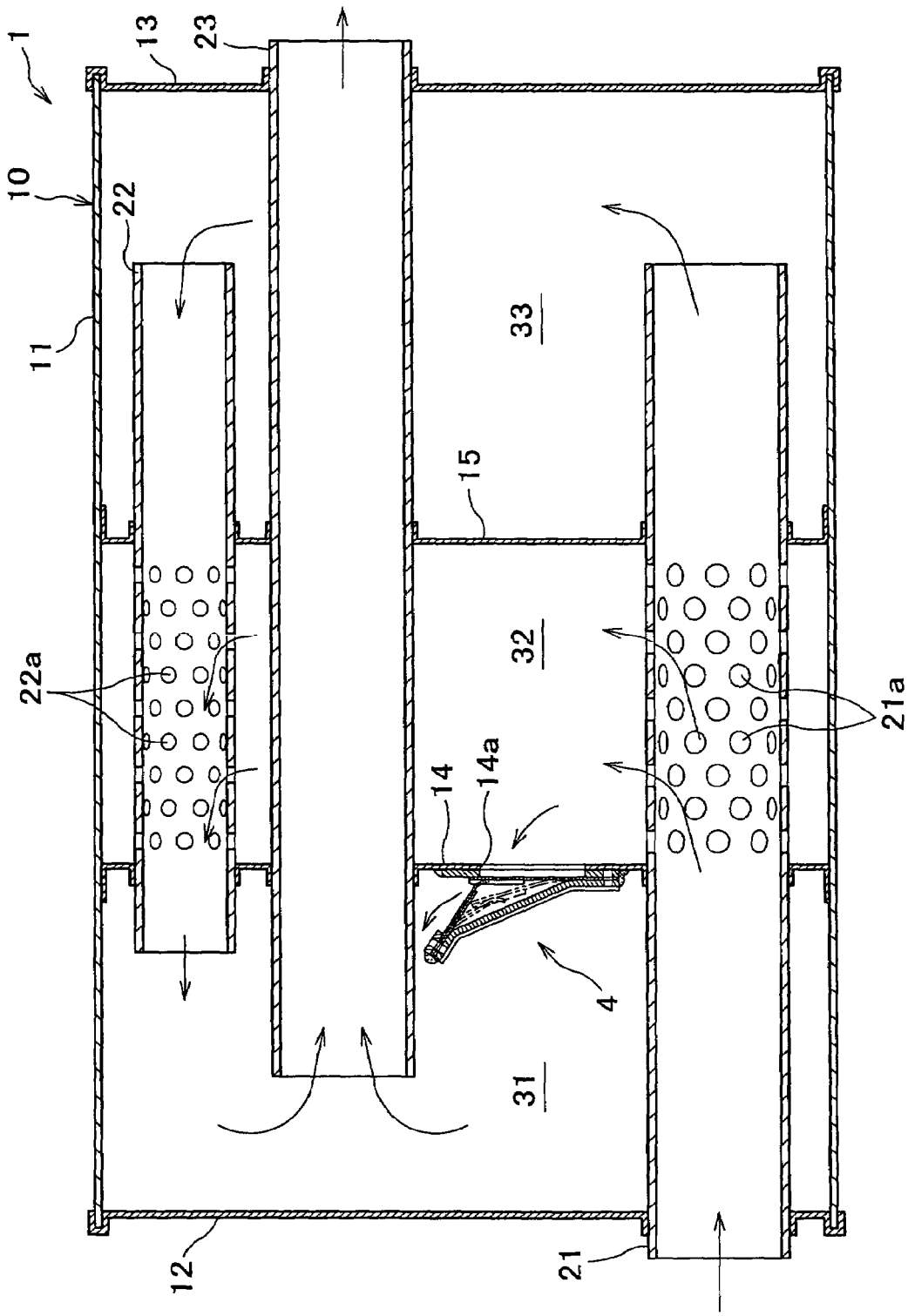
FIG. 1 shows one example of a silencer to which a valve device according to the present invention is applied.

As shown in FIG. 1, a silencer or muffler 1 interposed in an exhaust system for the engine includes a main body 10. The main body 10 consists of a tubular shell 11, and end walls 12, 13 for closing one end and the other end of the shell 11. The internal space of the main body 10 is divided into three sections by first and second separators 14, 15. Further, an exhaust gas inlet pipe 21, an inner pipe 22, and an exhaust gas outlet pipe 23 form passages for exhaust gas.

The first separator 14 and the second separator 15 are arranged in the main body 10 of the silencer 1 in a manner parallel to the end walls 12, 13. A first silencer chamber 31 is formed between the end wall 12 and the first separator 14, a second silencer chamber 32 is formed between the first separator 14 and the second separator 15, and a third silencer chamber 33 is formed between the second separator 15 and the end wall 13.

The exhaust gas inlet pipe 21 extends through the end wall 12, the first separator 14, and the second separator 15, and communicates an exhaust gas passage from the engine and the third silencer chamber 33. A large number of through holes 21a are formed in a pipe wall of the exhaust gas inlet pipe 21 at an area positioned in the second silencer chamber 32.

The inner pipe 22 extends through the first separator 14 and the second separator 15, and communicates the first silencer chamber 31 and the third silencer chamber 33. A large number of through holes 22a are formed in a pipe wall of the inner pipe 22 at an area positioned in the second silencer chamber 32, so that the inner pipe 22 and the exhaust gas inlet pipe 21 are in communication through the second silencer chamber 32.

The exhaust gas outlet pipe 23 extends through the first separator 14, the second separator 15, and the end wall 13, and communicates the first silencer chamber 31 and the external.

With this construction of the silencer 1, exhaust gas flowing to the exhaust gas inlet pipe 21 flows along two passages: a passage through the third silencer chamber 33, the inner pipe 22, the first silencer chamber 31, and to the exhaust gas outlet pipe 23; and a passage through the through holes 21a, the second silencer chamber 32, the through holes 22a, the inner pipe 22, the first silencer chamber 31, and to the exhaust gas outlet pipe 23.

When a large volume of exhaust gas flows into the exhaust gas inlet pipe 21 with high speed rotation of the engine, the above two passages become insufficient and exhaust gas pressures at the second and third silencer chambers 32, 33 increase, leading to decreased output of the engine.

For this reason, an opening 14a for a bypass passage is provided in the first separator 14 to communicate the second silencer chamber 32 and the first silencer chamber 31, and a valve device 4 is arranged at the opening 14a. The valve device 4 opens when the exhaust gas pressure reaches to a certain pressure. At a high speed rotating range of the engine, a large volume of exhaust gas is discharged smoothly to atmosphere from the total of three passages, i.e. the above two passages and the bypass passage.

The valve device 4 will be described below with reference to FIGS. 2 through 4.

Figure 2:
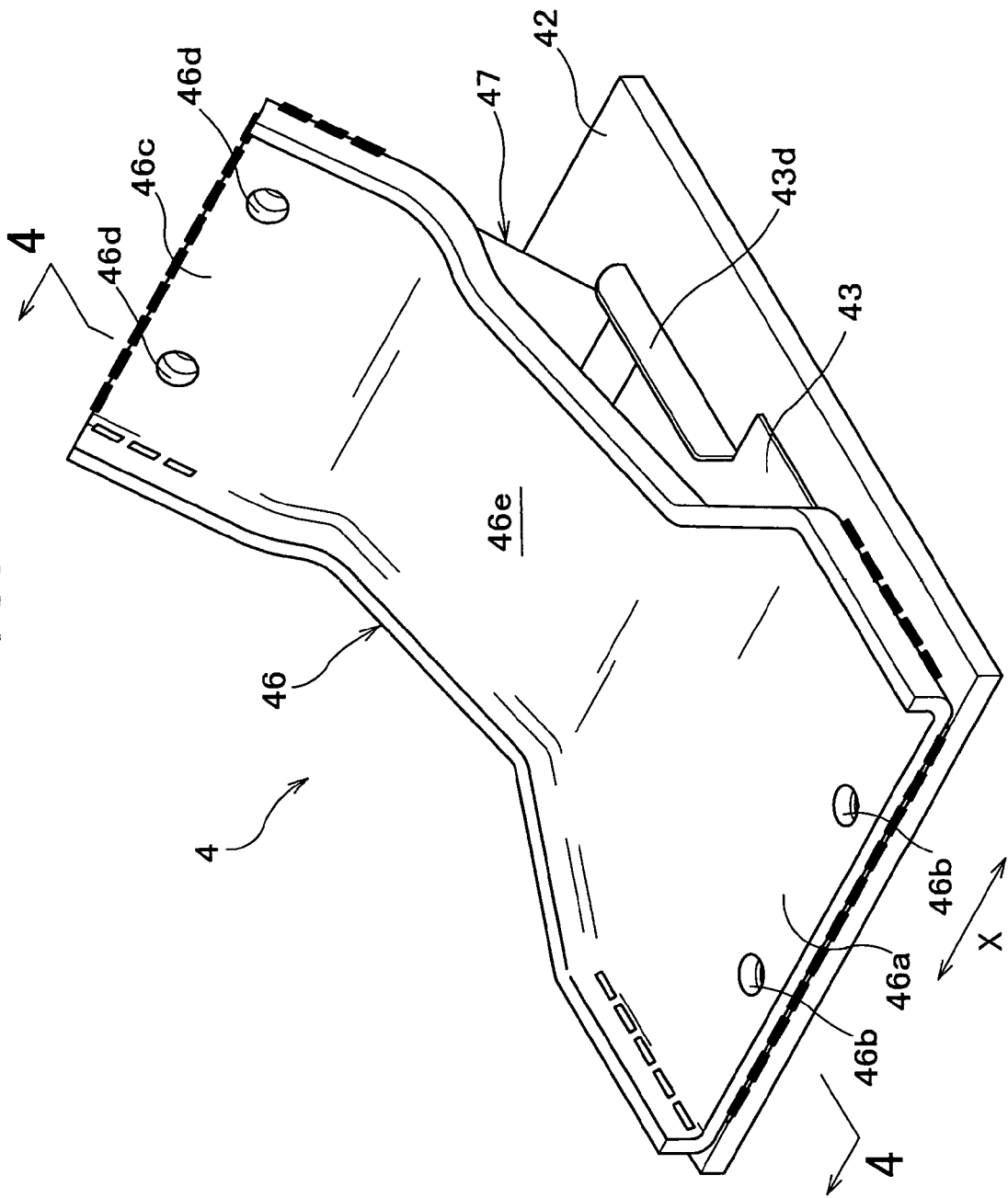
FIG. 2 is a perspective view of a valve device according to one preferred embodiment of the present invention.
Figure 3:
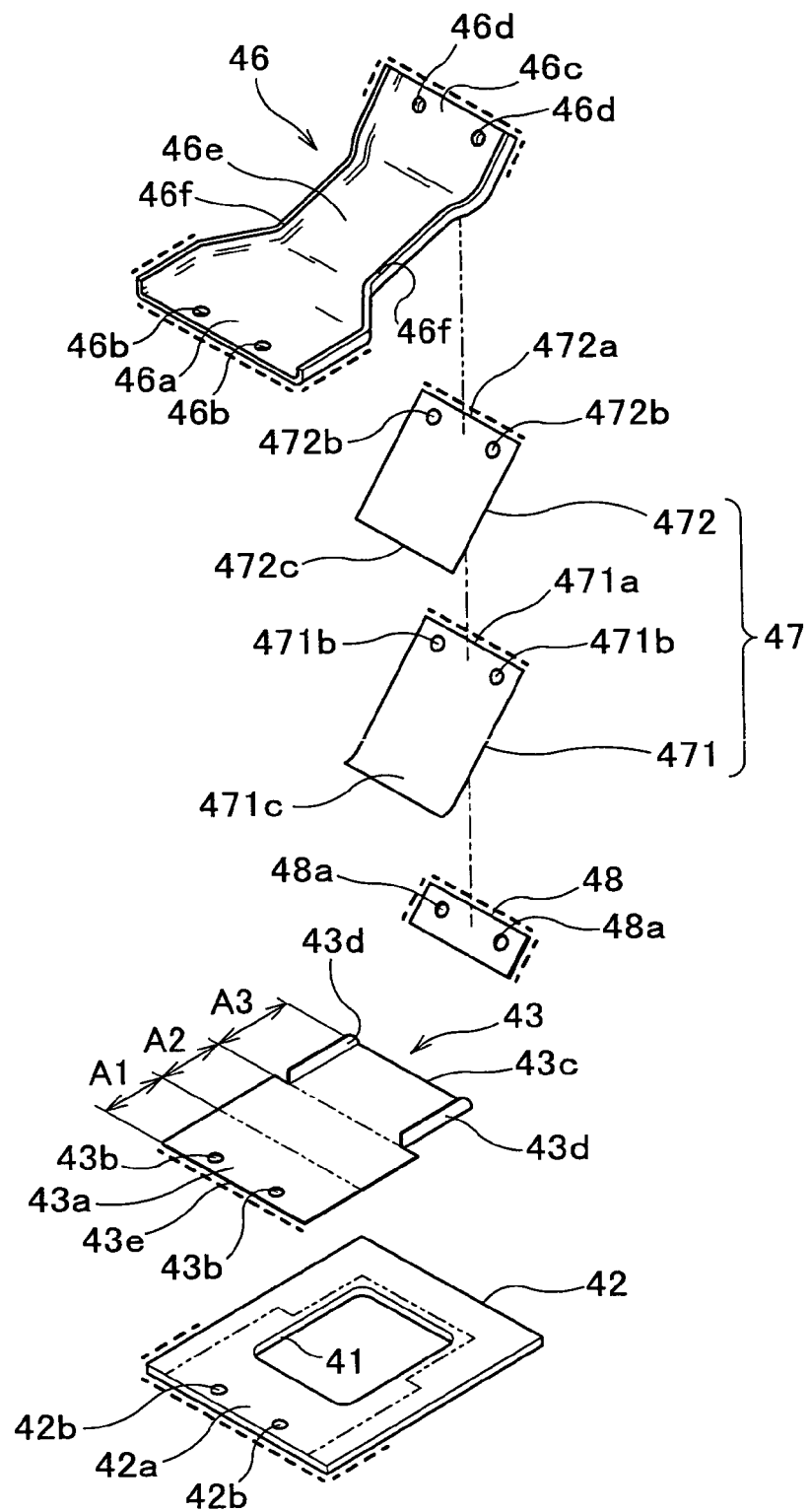
FIG. 3 is an exploded perspective view of the valve device.
Figure 4:
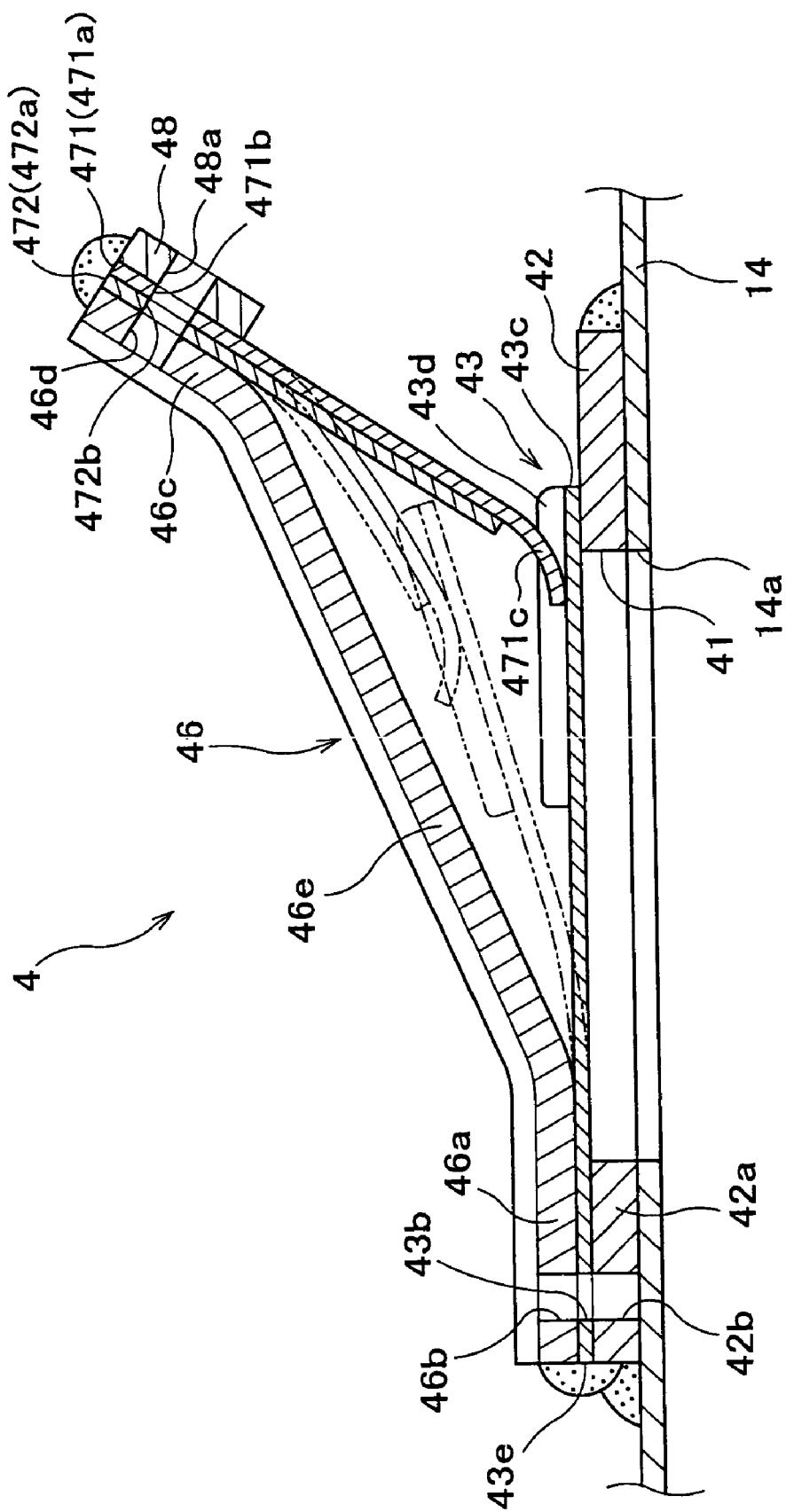
FIG. 4 is a sectional view taken along the line 4—4 of FIG. 2.

As shown in FIGS. 2 through 4, the valve device 4 includes a valve seat (base) 42 having a valve opening 41, a plate-like valve 43 as a valve for opening and closing the valve opening 41, a stopper member 46 for restricting the degree of opening of the plate-like valve 43, and a plate spring (plate spring member) 47 for adjusting deflection characteristics of the plate-like valve 43.

The valve seat 42 is formed by a rectangular plate having a rectangular valve opening 41. Provided at the proximal portion 42a of the valve seat 42 are two through positioning holes 42b, 42b.

The plate-like valve 43 is formed by a deformable thin rectangular plate, and is positioned to cover the valve opening 41. For example, the plate-like valve 43 may be a plate made of spring steel with a thickness of approximately 0.15 mm. At the proximal portion 43a of the plate-like valve 43 positioning holes 43b, 43b are formed such that the position and the size thereof correspond to the positioning holes 42b, 42b of the valve seat 42. The proximal portion 43a of the plate-like valve 43 is sandwiched and fixed between the stopper member 46 and the valve seat 42 in an area A1 shown in FIG. 3, i.e. a certain range from the proximal end 43e that is associated with the terminal end of the plate-like valve 43. Meanwhile, in an area A3 shown in FIG. 3, i.e. a certain range from the distal end 43c of the plate-like valve 43, the plate-like valve 43 is bent at both side edges thereof in a direction away from the seat valve 42 to form bent portions 43d, 43d. With provisions of the bent portions 43d, 43d, the plate-like valve 43 increases its flexural rigidity at the area A3 so that resonance of the plate-like valve 43 can be restricted. Further, because the flexural rigidity is higher in the area A3, the plate-like valve 43 deflects in an area A2 of FIG. 3 that is sandwiched between the area A1 and the area A3 to open and close the valve opening 41.

Because the bent portions 43d, 43d are bent in the direction remotely from the valve seat 42, the plate-like valve 43 can seal the valve opening 41 without a gap.

A bent angle of each bent portion 43d may be set desirably as long as the bent portion is bent in the direction remotely from the valve seat 42. For example, the bent portion 43d may be bent perpendicularly to the valve seat 42, or the bent angle may be approximately 45 degrees. Width of the plate-like valve 43 in an area sandwiched between the stopper member 46 and the valve seat 42 (size in the direction of Arrow X as shown in FIG. 2) is smaller than widths of the valve seat 42 and the stopper member 46.

The stopper member 46 integrally consists of a proximal portion 46a as a pressure retainer for the plate-like valve 43, a stopper surface 46e extending from the proximal portion 46a and tilting against the proximal portion 46a, and a distal portion 46c extending further from the stopper surface 46e and tilting further against the stopper surface 46e. The stopper member 46 is formed by pressing a plate member that is thicker than the plate-like valve 43 and having a thickness of, for example, approximately 2 mm. The stopper member 46 functions to fix the plate-like valve 43 onto the seat valve 42. The stopper member 46 also functions to receive the plate-like valve 43 at the stopper surface 46e when the plate-like valve 43 deflects to a large extent, so as to prevent excessive deflection of the plate-like valve 43. Both side edges of the stopper member 46 are bent throughout the length thereof in the direction away from the valve seat 42, and form ribs 46f, 46f (FIG. 3). This improves the stiffness of the stopper member 46. At the proximal portion 46a of the stopper member 46 positioning holes 46b, 46b are formed such that the position and the size thereof correspond to the positioning holes 42b, 42b of the valve seat 42.

The plate spring 47 is fixed to the distal portion 46c of the stopper member 46. A pair of through positioning holes 46d, 46d is formed at the distal portion 46c for positioning the plate spring 47 upon fixing the plate spring 47.

The plate spring 47 consists of a first spring 471 and a second spring 472, which are superposed one on top of the other.

The first spring 471 is a rectangular plate spring made of spring steel that is thinner than the plate-like valve 43a and having a thickness of, for example, approximately 0.1 mm. A pair of positioning holes 471b, 471b is formed at one end 471a of the first spring 471 such that the position and the size thereof correspond to the positioning holes 46d, 46d of the stopper member 46. The other end 471c (FIG. 3) of the first spring 471 obliquely abuts on the area A3, i.e. a certain range from the distal end 43c of the plate-like valve 43. The first spring 471 is obliquely arranged to extend toward the plate-like valve 43 in a direction from the distal end 43c to the proximal portion 43a of the plate-like valve 43. The other end 471c of the first spring 471 is bent to form a curved surface so that the distal proximity thereof abuts on the plate-like valve 43 in a manner facing substantially the same direction as the plate-like valve 43. Because the other end 471c of the first spring 471 is formed as a curved surface, sliding operation of the plate-like valve 43 and the plate spring 47 can be achieved smoothly.

The second spring 472 is a rectangular plate spring made of spring steel that is thinner than the plate-like valve 43 and having a thickness of, for example, approximately 0.1 mm. A pair of positioning holes 472b, 472b is formed at one end 472a of the second spring 472 such that the position and the size thereof correspond to the positioning holes 46d, 46d of the stopper member 46. Length of the second spring 472 in the longitudinal direction to the other end 472c (FIG. 3), i.e. length in the deflecting direction, is shorter than the first spring 471. This makes it possible to achieve as smooth deformation when the first spring 471 and the second spring 472 are superposed and deflected.

As described previously, the plate spring 47 that is fixed to the stopper member 46 abuts on the plate-like valve 43 at the other end 471c. In this event, the plate spring 47 obliquely abuts against the plate-like valve 43 so that the abutting position shifts toward the proximal portion 43a of the plate-like valve 43 as the degree of opening of the plate-like valve 43 increases. Further, because the abutting position exists in the area A3 that is reinforced by the bent portion 43d, 43d, it is possible to prevent the plate-like valve 43 from being bent with a certain degree of abutting force. Because the area A3 hardly deflects or vibrates, the plate spring 47 applies a stable urging force, thereby making the operation of the plate-like valve 43 stable.

Width of the plate spring 47 (471, 472) to be sandwiched between the stopper member 46 and a retainer 48 to be described later (length in X direction of FIG. 2) is smaller than the width of the stopper member 46 and the width of the retainer 48.

The first spring 471 and the second spring 472 are superposed underneath the surface of the distal portion 46c of the stopper member 46 facing to the valve seat 42. The retainer 48 is then superposed underneath the first spring 471, so that the stopper member 46, the plate spring 47, and the retainer 48 are fixed in an integral fashion.

The retainer 48 is a rectangular plate, the size of which corresponds to distal portion 46c of the stopper member 46. Because the plate spring 47 is sandwiched and fixed between the stopper member 46 and the retainer 48, it is possible to prevent stress concentration at the fixed point of the plate spring 47, thereby improving durability of the plate spring 47. Positioning holes 48a, 48a are formed in the retainer 48 such that the position and the size thereof correspond to the positioning holes 46d, 46d of the stopper 46. Preferably, the retainer 48 is formed by a member, the stiffness of which is higher than the plate spring 47 and which has durability against welding, that is, a thick member having a thickness of approximately 2 mm.

A manner of fixing the plate-like valve 43, the stopper member 46, and the plate spring 47 will be described below. In FIGS. 2 and 3 to be referred herein, each thick broken line indicates a range to which welding is applied.

When the plate spring 47 is fixed to the stopper member 46, the second spring 472, the first spring 471, and the retainer 48 are superposed in this order underneath the distal portion 46c of the stopper member 46 such that the positioning holes 46d, 472b, 471b, and 48a are positioned to be overlapped. In this event, a reliable positioning can be achieved with the use of a pin, the diameter of which is in conformity with each of the positioning holes 46d, 472b, 471b, and 48a.

After the positioning, the stopper member 46, the first spring 471, the second spring 472, and the retainer 48 are integrally welded along the distal edge of the stopper member 46 (at one end edges of the first spring 471 and the second spring 472). By this welding, the stopper member 46, the plate spring 47, and the retainer 48 become anyhow integral, which does not require positioning.

Next, the stopper member 46 and the retainer 48 are welded at both side edges thereof in a certain range from the distal end of the stopper member 46. In this event, the plate spring 47 is not welded because the width of the plate spring 47 is shorter than the stopper member 46 and the retainer 48. Therefore, the plate spring 47 is fixed in a manner to be sandwiched between the retainer 48 and the distal portion 46c of the stopper member 46.

As previously described, the plate spring 47 made of thin plate members is positioned and temporally supported merely along the edge of the distal portion 46c of the stopper member 46, and the plate spring 47 is fixed in a manner to be sandwiched between the stopper member 46 and the retainer 48. This can eliminate drawbacks, such as breakage (with a hole) and distortion of the plate spring 47 during welding. Arc welding or laser welding may be utilized for the welding.

The plate-like valve 43 and the stopper member 46 are fixed to the valve seat 42. The plate-like valve 43, then the stopper member 46 are superposed in this order onto the proximal portion 42a of the valve seat 42 such that the positioning holes 42b, 43b, and 46b are positioned to be overlapped. In this event, a reliable positioning can be achieved with the use of a pin, the diameter of which is in conformity with each of the positioning holes 42b, 43b, and 46b.

After the positioning, the valve seat 42, the plate-like valve 43, and the stopper member 46 are integrally welded along the proximal edge of the stopper member 46. By this welding, the valve seat 42, the plate-like valve 43, and the stopper member 46 become anyhow integral, which does not require positioning.

Next, the valve seat 42 and the stopper member 46 are welded at both side edges thereof in a certain range from the proximal end of the stopper member 46. In this event, the plate-like valve 43 is not welded because the width of the plate-like valve 43 is shorter than the valve seat 42 and the stopper member 46. Therefore, the plate-like valve 43 is fixed in a manner to be sandwiched between the valve seat 42 and the proximal portion 46a of the stopper member 46.

As previously described, the plate-like valve 43 made of a thin plate member is positioned and temporally supported merely along the edge of the proximal end 43e, and the plate-like valve 43 is fixed in a manner to be sandwiched between the valve seat 42 and the stopper member 46. This can eliminate drawbacks, such as breakage (with a hole) and distortion of the plate-like valve 43 during welding. Arc welding or laser welding may be utilized for the welding.

The plate-like valve 43, the stopper member 46, and the plate spring 47 are fixed by means of welding and without requiring bolts. Therefore, tapping operation and screwing operation for a plurality of small bolts can be omitted, which results in decreased production cost for each valve device. Furthermore, if the valve device 4 is fixed to the first separator 14 of the silencer 1 by means of welding along edges of the valve seat 42, it is not necessary to use bolts, which further decreases the production cost.

Operation of the valve device 4 will be described. When the number of rotations of the engine is low, the exhaust gas pressure within the second silencer chamber 32 is low. Because the plate-like valve 43 contacts with the valve seat 42 without deflection, the valve device 4 is closed.

When the number of rotations of the engine increases and the exhaust gas pressure within the second silencer chamber 32 rises to a certain pressure, pressure force (force) that is applied to the plate-like valve 43 increases so that the plate-like valve 43 starts to deflect. In this instance, because the exhaust gas pressure of the engine has pulsation, the plate-like valve 43 is likely to vibrate. However, according to the plate-like valve 43, the provision of the bent portions 43d, 43d makes the stiffness of the plate-like valve 43 sufficiently high and therefore significantly prevents an occurrence of resonance. When the plate-like valve 43 deflect to a certain extent, the plate spring 47 also deflects, so that the abutting position of the plate spring 47 and the plate-like valve 43 shifts toward the proximal end of the plate-like valve 43. When doing so, the urging force of the plate spring 47 does not increase abruptly. However, shifting the abutting position makes the moment which the plate spring 47 rotates the plate-like valve 43 decreased to a relatively large extent. Therefore, as illustrated by the double-dashed line of FIG. 4, the plate-like valve 43 opens quickly to a large extent.

When the number of rotations of the engine decreases again, the deflection amount of the plate-like valve 43 becomes smaller, and below a certain deflection amount the abutting position of the plate spring 47 against the plate-like valve 43 shifts toward the distal end of the plate-like valve 43. This makes the moment which the plate spring 47 rotates the plate-like valve 43 increased to a relatively large extent. The plate-like valve 43 is therefore closed quickly. In this event, likewise the opening operation of the plate-like valve 43, resonance hardly occurs because of the bent portions 43d, 43d. Also, because the plate spring 47 consists of two plate members to be superposed together, resonance hardly occurs.

Further, even if the valve device 4 is used in a condition where strong vibration affects adversely, bolts are not loosened due to vibration because each of the parts constituting the valve device 4 is fixed by welding. Moreover, stable operation of the valve device 4 can be achieved because the plate-like valve 43 and the plate spring 47 are fixed without distortion at the time of welding.

While the present invention has been described in detail with reference to a specific embodiment thereof, it will be apparent to one skilled in the art that various changes and modifications may be made without departing from the scope of the claims.

For example, in the preferred embodiment, the valve device 4 has been described as of the type in which the plate-like valve 43 contacts on the surface of the valve seat 42 to close the valve. However, the present invention may be applicable to a valve device of the type in which the distal ends and both side edges of the plate-like valve 43 and the plate spring 47 naturally extend into the valve opening of the base to close the valve opening between the inner walls of the valve opening and the distal end and the side edges of the plate-like valve 43, that is the type in which the housing of the plate-like valve functions as the base. In this instance, the bent portions 43d, 43d may be bent in a direction away from the stopper member 46, in other words, in a downward direction of FIG. 3, etc.

Further, instead of fixing the parts of the valve device 4 by welding, the parts may be fixed by bolts as in the case of a conventionally known method.

What is claimed is:

1. A valve device for a silencer, which opens a bypass passage provided in the silencer to flow exhaust gas through the bypass passage when exhaust gas pressure rises to a certain pressure, the valve device comprising:
   a base having a valve opening through which exhaust gas flows; and
   a plate-like valve for opening and closing the valve opening, the plate-like valve being fixed to the base at its proximal portion,
   wherein
   the plate-like valve is bent at both side edges thereof in a certain range extending from its distal end toward the proximal portion.

2. A valve device far a silencer according to claim 1, further comprising
   a plate spring member,
   a distal end of which abuts on a surface of the plate-like valve to urge the plate-like valve toward a valve close position,
   wherein
   the plate spring member is obliquely arranged relative to the platelike valve such that an abutting position of the plate spring member against the plate-like valve shifts toward the proximal portion of the plate-like valve with an increase in a deflection amount of the plate-like valve, and
   wherein
   the plate spring member abuts on a reinforced area of the plate-like valve.

3. A valve device for a silencer according to claim 2, wherein the plate spring member is bent to form a curved surface.

4. A valve device for a silencer according to claim 2, further comprising a stopper member, wherein the plate-like valve is sandwiched between the base and a proximal portion of the stopper member and fixed thereto, and wherein the plate spring member is fixed to a distal portion of the stopper member.

5. A valve device for a silencer according to claim 4, wherein the stopper member, the plate-like valve, and the base are fixed together by welding.

6. A valve device for a silencer according to claim 4, wherein the plate spring member is fixed to the stopper member by welding.

7. A valve device for a silencer according to claim 2, wherein the reinforced area of the plate-like valve includes said certain range wherein said valve is bent at said both side edges thereof.

8. A valve device for a silencer according to claim 2, wherein the distal end of the plate spring member is bent to form a curved surface.

9. A valve device for a silencer according to claim 2, including a second plate spring member which urges said plate-like valve toward the valve close position.

10. A valve device for a silencer according to claim 9, wherein said second plate spring member is superposed on, and has a shorter length than, the first mentioned plate spring member.

11. A valve device for a silencer according to claim 1, wherein an intermediate portion of said plate-like valve, between said proximal portion and said distal end, operatively engages said valve opening in said base to open and close said valve opening.

12. A valve device for a silencer, which opens a bypass passage provided in the silencer to flow exhaust gas through the bypass passage when exhaust gas pressure rises to a certain pressure, the valve device comprising:
   a base having a valve opening through which exhaust gas flows;
   a plate-like valve which opens and closes the valve opening;
   a stopper which restricts a degree of opening of the plate-like valve; and
   a plate-like spring which urges the plate-like valve toward a closed position thereof;
   the plate-like valve being fixed to the base and the stopper at a proximal portion of said valve; and
   the plate-like valve is reinforced against deflection in a certain range extending from its distal end toward the proximal portion.

13. A valve device for a silencer according to claim 12, wherein a distal end of said plate-like spring abuts on a surface of the plate-like valve to urge the plate-like valve toward said closed position thereof, the plate spring member is obliquely arranged relative to the plate-like valve such that an abutting position of the plate spring member against the plate-like valve shifts toward the proximal portion of the plate-like valve wit an increase in a deflection amount of the plate-like valve, and the plate spring member abuts on said reinforced range of the plate-like valve.

14. A valve device for a silencer according to claim 12, wherein
   the plate-like valve is sandwiched between the base and a proximal portion of the stopper member and fixed thereto, and
   wherein the plate spring member is fixed to a distal portion of the stopper member.

15. A valve device for a silencer according to claim 12, wherein the stopper member, the plate-like valve, and the base are fixed together by welding.

16. A valve device for a silencer according to claim 12, wherein the plate spring member is fixed to the stopper member by welding.

17. A valve device for a silencer according to claim 12, wherein the reinforced range of the plate-like valve includes side edges of said valve which are bent.

18. A valve device for a silencer according to claim 12, wherein a distal end of the plate spring member which operatively engages said valve is bent to form a curved surface.

19. A valve device for a silencer according to claim 12, wherein the plate-like valve is reinforced against deflection in an intermediate portion thereof.

* * * * *